No. 756,614. PATENTED APR. 5, 1904.
W. F. FOLMER.
CAMERA.
APPLICATION FILED AUG. 20, 1903.
NO MODEL. 2 SHEETS—SHEET 2.

WITNESSES:

INVENTOR
William F. Folmer
BY
ATTORNEYS

No. 756,614. Patented April 5, 1904.

UNITED STATES PATENT OFFICE.

WILLIAM F. FOLMER, OF NEW YORK, N. Y., ASSIGNOR TO FOLMER & SCHWING MANUFACTURING COMPANY, OF NEW YORK.

CAMERA.

SPECIFICATION forming part of Letters Patent No. 756,614, dated April 5, 1904.

Application filed August 20, 1903. Serial No. 170,148. (No model.)

*To all whom it may concern:*

Be it known that I, WILLIAM F. FOLMER, a citizen of the United States, and a resident of the city of New York, borough of Manhattan, in the county and State of New York, have invented a new and Improved Camera, of which the following is a full, clear, and exact description.

The purpose of the invention is to provide a simple form of stereoscopic camera so constructed that in focusing the object or objects will be perfectly blended, appearing to the operator with all the depth, detail, and definition obtainable when a stereoscopically-photographed object is viewed through a proper instrument and to provide the camera with coacting but independent focusing-mirrors having shields or aprons acting in conjunction with mechanism in the main focusing-chamber of the camera-box in both idle and in focusing position to render it absolutely impossible for any light except that entering through the lenses at the proper time to reach the plate to be exposed, and also to provide simple and effective means for bringing the mirrors simultaneously to focusing position and holding them in such position, and means equally simple and effective, all exteriorly operated, for simultaneously releasing the mirrors from focusing position and automatically and almost instantly carrying them to an upper light-tight position in the focusing-chamber out of the cone of light of the lenses.

Another purpose of the invention is to provide a folding or collapsible stereoscopic focusing-hood and means for adjusting the hood to accord with the optical or visual requirements of the operator, the hood when not in use being entirely concealed in the camera-box, but is automatically readily brought to working position when the cover of the camera-box is opened, the said hood being self-contained or in one section.

A further feature of the invention is to so attach the focusing-hood at the upper portion of the focusing-chamber that it may be expeditiously and conveniently removed for access to the focusing-mirrors, for example, and as quickly and as readily replaced in position.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
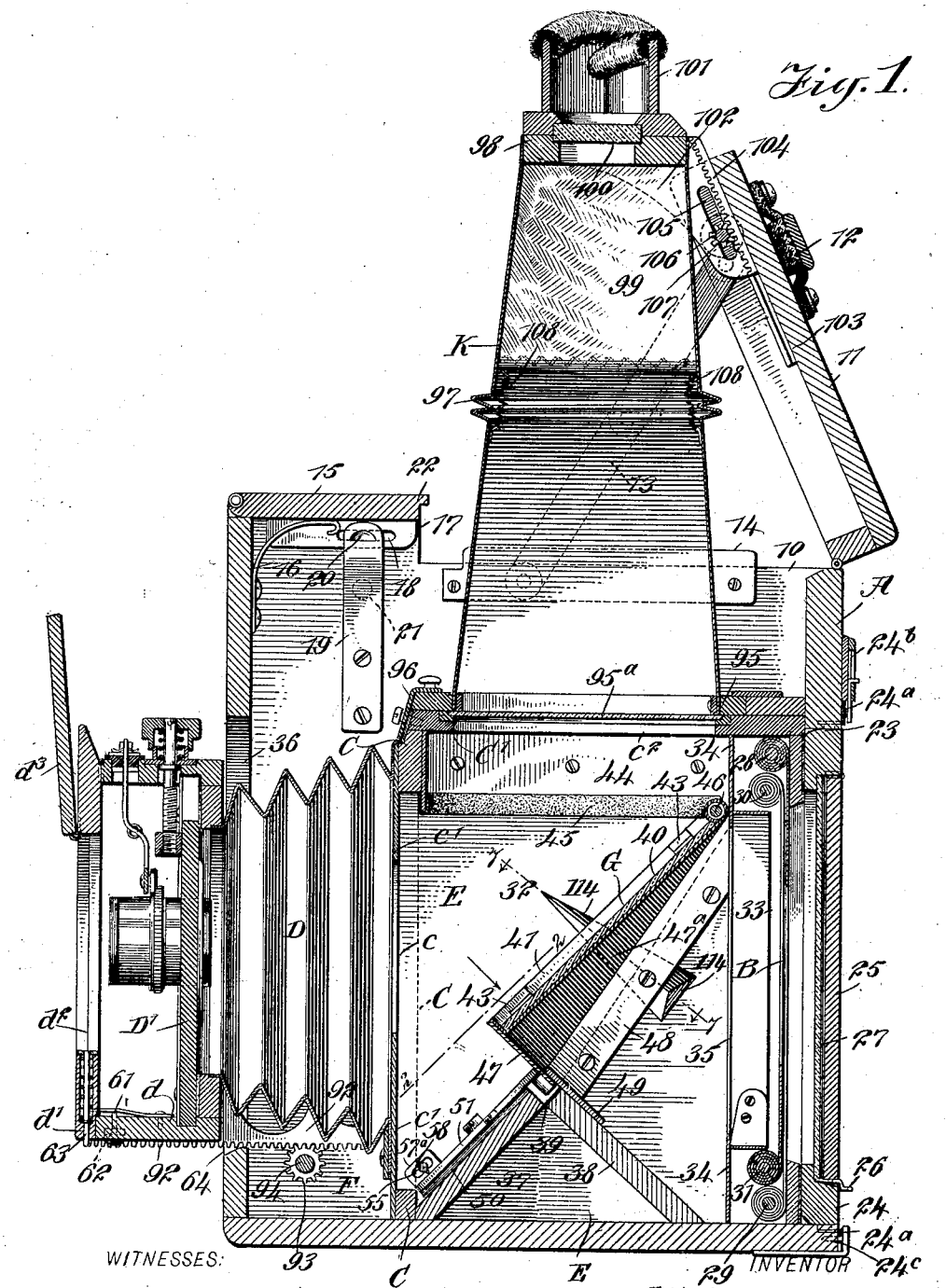
Figure 2:
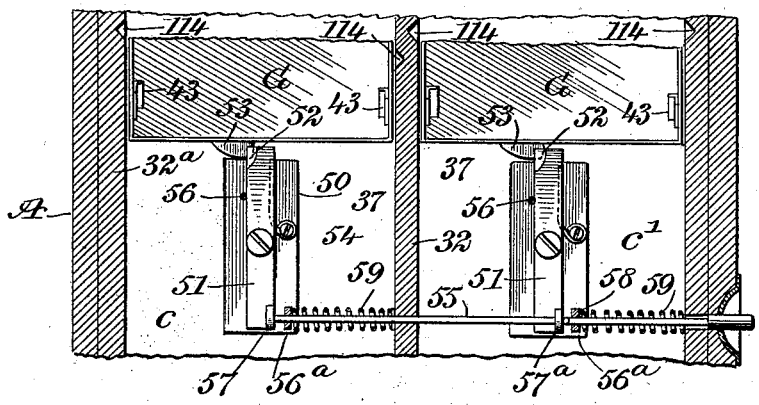
Figure 3:
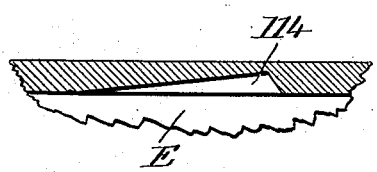

Figure 1 is a central longitudinal section taken through the improved camera. Fig. 2 is a diagonal transverse section taken practically on the line 2 2 of Fig. 1, illustrating the latch device for the focusing-mirrors and the means for releasing said devices. Fig. 3 is a detail section through a wall of the focusing-chamber, illustrating an air-passage therein.

The camera-box A, which may be of any suitable size, is provided at its upper rear portion with a recess 10, (shown in Fig. 1,) and at the rear of the recessed portion of the camera-box a main cover 11 is suitably hinged, which cover is provided with a handle 12, whereby the box may be readily carried or the cover may be readily lifted, and the cover is held in its upper position (shown in Fig. 1) by means of rule-hinges 13, which hinges are pivoted to the sides of the cover and are likewise pivoted preferably to plates 14, secured to the inner side faces of the camera-box and extending beyond the recessed portion 10 thereof, so as to serve as guides for the said cover when the latter is closed. The main cover 11 is held in closed position through the medium of an auxiliary cover 15, which is located at the upper front portion of the camera-box and is preferably provided with a tongue 22 at its upper rear edge, adapted to enter a suitable groove in the upper forward portion of the main cover 11, and these two covers 11 and 15 may have overlapping or interlocking connection in any suitable manner. The auxiliary or forward cover 15 is normally pressed upward by springs 16, engaging with its under face and secured to the inner wall of the front portion of the camera-box, as is illustrated at Fig. 1, and at each end of the said auxiliary cover 15 keeper-plates 17 extend downward, having longitudinal openings 18 therein, which openings in the keeper-plates receive projections 20 from spring-latch plates 19, attached to the inner side faces of the camera-box, and these spring-latch plates are released from engagement with the keeper-plates 17 by push-buttons 21, (shown in dotted lines in Fig. 1,) located at each side of the camera-box and operated from the exterior thereof.

At the rear of the camera-box an opening 23 is made, which opening is adapted to receive the back ground-glass frame 25 of the camera, and this back ground-glass frame 24 is provided with a suitable door 25, which may be opened to expose the ground glass and which is held normally closed by a suitable latch 26. This back ground-glass frame 24 is provided with the usual top and bottom springs $24^a$, whereby the frame may be carried outward to admit of the admission of the plate-holder, the upper spring $24^a$ being held against the camera-box by a suitable sliding latch $24^b$, (shown in Fig. 1,) while the lower spring of the said back ground-glass frame is recessed to engage with a pin carried by a bracket $24^c$ at the bottom back portion of the camera and centrally located.

The opening 23 at the rear of the camera, receiving the back ground-glass frame, is equally divided by a centrally-located upright partition 27, and in front of the back ground-glass frame and suitably separated therefrom a curtain or focal-plane shutter B is located, of any approved type, one curtain of which shutter is shown rolled upon an upper shaft 28 and a lower shaft 29 and the other curtain upon an upper shaft 30 and a lower shaft 31.

Immediately in front of the dividing-bar 27 at the rear opening 23 a division-board 32 is located, which extends forwardly, and this division-board at its rear end is removed a suitable distance from the shutter. The division-board 32 extends from the bottom of the camera-box to within a predetermined distance of its upper edge, as is shown in Fig. 1, but terminates a desired distance short of the front of the said camera-box, as is also shown in Fig. 1. At each side of this division-board 32 a frame 33 is located at the rear portion of the camera-box and in front of the shutter, the said frames being attached, preferably, to a rear transverse partition 34, having openings 35 therein corresponding practically to the dimensions of the said frames 33.

At the forward edge of the division-board 32 a skeleton frame C is located, and plates $c'$ are attached to the front portion of this frame, having centrally-located openings $c$ therein, one of the openings being at each side of the aforesaid division-board 32. An upper skeleton frame $C'$ is provided, bearing at its forward portion on the upper part of the vertical front skeleton frame C and having bearing at its sides against the inner faces of the camera-box and at its rear against the rear portion of the said box, being secured in any suitable or approved manner, and this upper skeleton frame $C'$ has openings $c^2$ therein, one at each side of the aforesaid division-board 32. Under this construction it will be observed that the camera-box at its lower portion is provided with a main chamber E, which I designate a "focusing-chamber," and that the division-board 32 divides the said focusing-chamber into two compartments $e$ and $e'$. (Illustrated in Fig. 2.) Under this construction a forward chamber F is provided, which may be termed a "bellows-chamber," as the bellows D for the camera is located in the said chamber and extends out through an opening 36 in the front of camera-box, being secured in a light-tight manner to the forward skeleton partition C or the plates $c'$, attached thereto.

At the bottom of the focusing-chamber E two inclined planes 37 and 38 are located, one extending upwardly and rearwardly from the forward portion of the said chamber and the other upwardly and forwardly from the rear portion thereof. These inclined planes are preferably made of wood or metal of suitable weight and extend from side to side of the said chamber. The upper edges of the said inclined planes 37 and 38 are made to meet at their upper inner edges, as is shown in Fig. 1. It may be here stated that preferably in the construction of the camera inner auxiliary walls $32^a$ are provided at the outer sides of the focusing-chamber E, as is illustrated in Fig. 2.

Each compartment of the focusing-chamber E contains a focusing-mirror G, and both focusing-mirrors are hinged to a shaft 46, which extends from side to side of the said focusing-chamber at its upper rear portion adjacent to the upper part of the rear partition 34. The hinged connection between the focusing-mirrors and the shaft 46 is spring-controlled, and the tendency of the springs controlling said connection is to normally force the said mirrors upward to a horizontal position at the upper portion of the said focusing-chamber. Each focusing-mirror G is mounted in a suitable frame 40, and each frame is provided with upwardly-extending side flanges 41 and similar flanges at their forward ends. The reflecting material of the mirrors is shown as held in the frames 40 by means of suitable brackets 43. At the upper portion of the focusing-chamber E, in each compartment thereof, plates 44 are attached to the upper framing of the compartments at the sides and at the front, extending downward below the said framing, as is shown in Fig. 1, and the lower edges of these plates 44 are covered, preferably, with felt or other yielding material, so that when the mirrors are carried forcibly upward, as they are at times, their contact with the said plates will be hardly noticeable, and so that a light-tight connection will then be formed between the mirrors and the said plates, since the upper flanges 41 of the mirror-frames will engage with the outer side faces of the yielding material 45 and the bottom edges of such material will engage with the upper faces of the mirrors. Each mirror is provided with a side and a front flange extending downwardly from the mirror-frame, the side flanges being designated as $47^a$ and the front flanges 47. The side flanges are more or less inclined at their bottom edges, being made to taper upwardly and diminish at the hinged connection of the mirrors with the carrying-shaft 46. In order that the mirrors when in their lower or focusing position shall completely shut off all light from the rear of the camera or from the plate-holder when placed in position in the camera, sealing-plates 48 are offset from each side of each compartment of the focusing-chamber E, as is best shown in Fig. 1, and other sealing-plates, 49, are secured on the rear upper faces of the rear inclined planes 38, as is shown in the same figure, the sealing-plates 49 extending beyond the upper forward edges of the said inclined planes 38, and when the focusing-mirrors G are in their lower position the flanges 47 and $47^a$ engage with the outer forward faces of the said sealing-plates completely shutting off any light from the rear of the camera, yet not interfering with the upward movement of the mirrors when necessary. Those parts 47 and $47^a$ designated above as flanges are properly aprons or light shields and are rendered opaque.

The focusing-mirrors G are held in their lower positions and are released from the said lower or focusing positions preferably by the mechanism illustrated principally in Fig. 2, which mechanism consists of a plate 50, secured centrally on the front face of the inclined plane 37 in each focusing-compartment, and on each of the said plates 50 a latch-bar 51 is about centrally fulcrumed, having preferably a beveled surface 52 at one corner of its upper end, the upper ends of the latch-bars extending beyond the upper ends of their connecting-plates 50. These beveled surfaces 52 on the latch-bars are adapted to receive correspondingly-beveled keepers 53, secured to the front lower portions of the focusing-mirrors G at their centers, and as the focusing-mirrors are carried downward to focusing position the beveled surfaces of the latch-bars and keepers meet and the said keepers force the latch-bars to one side and pass back of the latch-bar, whereupon the latch-bars return to their normal position—namely, in locking engagement with the keepers. Springs 54 are attached at one end to the plates 50 and have bearing against the latch-bars at their opposite ends at the side opposite that at which the beveled surfaces 52 are formed, as is also shown in Fig. 2, and these springs 54 serve to normally keep the latch-bars 51 in locking position. The said latch-bars are prevented from moving beyond such a position in one direction, or the direction in which the springs 54 act, by placing studs 56 on the said plates to engage with the said latch-bars, as is also shown in Fig. 2. The latch-bars are released from engagement with the keepers 53 in the following manner: A push-bar 55 extends, preferably, from the left-hand side of the camera-box through the focusing-compartment $e'$ and through the division-board 32 and into the focusing-compartment $e$. This push-bar at its inner end has engagement with a lug 57, extending from the lower end of the latch-bar in the focusing-compartment $e$ and passes loosely through a lug $57^a$ at the corresponding portion of the latch-bar in the focusing-compartment $e'$. The said push-bar 55 also loosely passes through bearings $56^a$ on the plates 50, carrying the latch-bar, as is shown in Fig. 2. The push-bar 55 is provided with a pin or projection 58, which is adapted to engage with the lug $57^a$ on the latch-bar in the focusing-compartment $e'$, and springs 59 are so placed around the push-bar in each of the focusing-compartments as to normally force the said push-bar in an outward direction. When the focusing-mirrors are to be released from their focusing position and are to be carried upward, so as to admit of an exposure, it is simply necessary to press the push-bar inward, whereupon the push-bar will so act on the latch-bars 51 as to carry their upper ends out of locking engagement with the keepers 53 on the mirrors, permitting the mirrors to be carried upward by the springs at their hinges. The mirrors are forced downward to their lower position by means of an arm 60, which is attached to the outer end of the shaft 46, carrying the mirrors, which end of the shaft projects beyond the right-hand side of the camera-box.

The bellows D is provided with the usual head $d$, and the front of this head is provided with a hinged section $d'$, having an opening $d^2$ therein, and this opening is adapted to be closed by a door $d^3$, hinged to the said front section $d'$. The front section $d'$ need only be opened when it is desired to remove the lens-board D'. The front section is locked ordinarily by means of a spring 61, carried by the head $d$ and operated by an exteriorly-located button 62, as is shown in Fig. 1. A spring-latch 63 is located in the bottom portion of the front section $d'$, adapted when the head of the bellows is carried inward to close the opening 36 at the front of the camera to engage at its bottom with an inclined surface 64 at the lower portion of the opening 36, thereby forcing the latch 63 upward, so that it will engage with any suitable keeper carried by the door $d^3$; but as soon as the bellows is carried outward the spring of the latch 63 will force it downward and permit the door $d^3$ to open, the hinges of which are spring controlled. The bellows is carried outward and inward by the ordinary rack-bars 92, attached to the head of the bellows and sliding in suitable ways in the camera-box, and the rackbars are engaged by pinions 93, carried by a shaft 94, exteriorly operated.

With reference to the focusing-hood K, this hood consists of a body of a yielding or pliable and light-proof material, the said focusing-hood being attached at its lower end to a frame 95, which carries a ground glass 95$^a$, and the said frame is fitted in a light-tight manner in the upper frame of the focusing-chamber E and is detachably connected to the said upper frame of the focusing-chamber by placing a suitable bearing-plate over one portion of the lower frame of the focusing-hood and providing appropriate latches 96 for the opposing side of the frame, having suitable locking devices. The focusing-hood K is provided with a folding or bellows section 97 about centrally between its ends and with a partition 99 above the bellows-section 97, extending down from the upper frame 98, thereby dividing the upper portion of the focusing-hood into two compartments. In the upper frame 98 a lens 100 is located in communication with each upper compartment. The lenses 100 are surrounded by a suitable eye-shield 101. The upper portion of the focusing-hood is connected with the main cover 11 of the camera-box, and when this cover is opened the hood is carried automatically upward, assuming immediately a rigid position, and the upper and lower portions of the focusing-hood are normally held so as to bring the bellows-section under desired tension by springs 108, interiorly located at the bellows-section of the said hood. The attachment of the focusing-hood to the main cover 11 is an adjustable one, so that the said hood can be adjusted as required by the visual condition of the operator. To that end the attachment is preferably made in the following manner—namely, by attaching brackets 102 to opposite sides of the hood at the top, which brackets are mounted to slide in suitable ways 103 at the inner face of the main cover 11, and each bracket is provided with rack-teeth 104, as is shown in Fig. 1, and with a longitudinal slot 105, said slots being parallel. A shaft 106, journaled in the cover 11, is passed through the said slots 105 and is provided with pinions 106 to engage with the teeth 104 on the said bracket. It will be observed that the focusing-hood is self-contained, being practically in one piece or section, and that it is quickly brought into position for use and that when the cover is closed the said focusing-hood will automatically fold down into the upper portion of the camera-box beneath the auxiliary cover 15 and over the top of the focusing-chamber E. The auxiliary cover 15 is of necessity open when the focusing-hood is closed in the camera-box.

It might happen that the vacuum or suction in the focusing-chamber E back of the focusing-mirrors G when the latter are in focusing position will act to retard the upward movement of said mirrors. Therefore to permit the mirrors to have speedy upward movement as soon as released from their focusing position and retarded movement just as they clear the cone of light from the lenses tapering channels 114 are made in the walls of the focusing-chamber E, the wide ends of which channels are at the rear of the mirrors when locked downward, as is shown in Fig. 1, while the contracted ends of the channels extend diagonally upward beyond the front faces of the mirrors. Under this construction when the mirrors are released from focusing position the air back of them escaping in the wider portions of the channels 114 destroys any vacuum which may exist and permits the springs controlling the mirrors to act to their full capacity and carry the mirrors upward with great speed until the upper ends of the channels are reached, whereupon the air-cushion above the mirrors will act to retard their upward movement and cause the mirrors to gradually seat themselves without shock in their upper position.

Having thus described my invention, I claim as new and desire to secure by Letters Patent—

1. In stereoscopic cameras, stereoscopic photographic lenses, an intercepting-reflector, and a focusing device above the reflector, having lenses stereoscopically arranged for imparting a duplicate reflected image, as described.

2. In stereoscopic cameras, a stereoscopic focusing device and coacting stereoscopic photographic lenses, one at an angle to the cone of light of the other, as described.

3. In stereoscopic cameras, a stereoscopic focusing device and coacting stereoscopic photographic lenses, one at an angle to the cone of light of the other, and interposed mirrors arranged for movement to and from the focusing device, as set forth.

4. In stereoscopic cameras, stereoscopic photographic lenses, and a coacting stereoscopic focusing device, the line of vision whereof intersects the cone of light of the photographic lenses, as decribed.

5. In cameras, a focusing-hood having stereoscopic view-lenses.

6. In cameras, a focusing-chamber, a focusing-mirror mounted for action in said chamber, and graduated channels in the walls of the chamber and in the path of the movement of the mirror.

7. In cameras, a focusing-chamber, a focusing-mirror mounted for action in said chamber, having graduated channels in its side walls, extending in the front of and to the rear of the mirror when the latter is in focusing position and diminishing in direction of the path of the mirror when moving out of focusing position, which channels serve to overcome suction relative to the mirror in its initial movement from focusing position, permitting a rapid movement at such time but retarding the movement of the mirror as it passes the cone of light from the lenses of the camera, as described.

8. In cameras, a focusing-chamber, a focusing-mirror mounted for action in said chamber, the chamber having an air-passage for the escape of air when the mirror initially ascends, which air-passage extends beyond the back of the mirror when in its lower position, terminating short of the seat of the mirror when in its full upper position, as described.

9. In cameras, a focusing-chamber, a focusing-mirror mounted for action in the said chamber, said chamber having a tapering air-passage in a wall for the escape of air when the mirror initially ascends, the wider portion of which air-passage extends beyond the back of the mirror when in its lower position, the contracted portion of the passage terminating short of the seat of the mirror when in its full upper position, as set forth.

10. In cameras, stereoscopic photographic lenses, and a focusing-hood having stereoscopic view-lenses, which hood is in predetermined relation to the photographic lenses, and focusing-reflectors interposed between the focusing-hood and the projecting cone of light from the photographic lenses, as set forth.

11. In a stereoscopic camera, stereoscopic photograpic lenses, and a stereoscopic focusing-hood adjustable to and from the cone of light of the stereoscopic photographic lenses, as described.

12. In a stereoscopic camera, a focusing-hood arranged relative to the photographic lenses of the camera, for the purpose described.

13. A stereoscopic focusing-hood for stereoscopic cameras.

14. A focusing-hood for cameras, stereoscopic lenses therefor, and a divisional partition between the lenses.

15. In stereoscopic cameras, a collapsible focusing-hood, stereoscopic lenses for the said hood, and a divisional partition between the lenses.

16. In stereoscopic cameras, a focusing-hood, self-contained and provided with a bellows-section intermediate of its ends, stereoscopic view-lenses at the upper portion of the hood, as described.

17. In cameras, a collapsible focusing-hood, means for detachably connecting the hood to the camera, the said hood having a bellows-section between its ends, and tensional devices adjacent to the said bellows-section and located within the hood, serving to hold the said hood rigid when in focusing position, as described.

18. In cameras, a camera-box, a cover for the same, a focusing-hood, stereoscopic lenses fitted thereto, means for detachably connecting the focusing-hood to the camera-box and for pivotally connecting it to the said cover, and tension devices within the focusing-hood, arranged in direction of the length of the hood, as described.

19. In stereoscopic cameras, a camera-box, a hinged cover therefor, a focusing-hood having a bellows construction, means for attaching the hood to a camera-box, the said hood being provided with stereoscopic view-lenses at its upper portion and a partition between the said lenses, and an adjusting connection between the cover and the said focusing-hood, as set forth.

20. In a camera, a focusing-chamber divided into two compartments, a focusing-mirror for each compartment, and a common support for both mirrors, as described.

21. In a stereoscopic camera, a focusing-chamber divided into two compartments, a shaft extending through the compartments, and focusing-mirrors having spring-controlled connection with the said shaft, the two mirrors being simultaneously operated upward or downward by the action of the said shaft.

22. In a stereoscopic camera, independent focusing-mirrors, and a means for simultaneously operating both of said mirrors from the exterior of the camera-box, as described.

23. In a stereoscopic camera, independent mirrors, a spring-controlled support common to both of the mirrors, keepers extending from the said mirrors, latches, a support on which the said latches are pivoted, tension devices for the latches, end portions of which latches are adapted for engagement with the said keepers on the mirror, and a shifting device operated from the outside of the camera-box and in operative connection with both of the latches, as described.

24. In stereoscopic cameras, a stereoscopic focusing device, and stereoscopic photographic lenses having permanent coacting relation to the focusing device.

In testimony whereof I have signed my name to this specification in the presence of two subscribing witnesses.

WILLIAM F. FOLMER.

Witnesses:
J. FRED. ACKER,
JNO. M. RITTER.